United States Patent
Simon

(10) Patent No.: US 11,635,028 B2
(45) Date of Patent: Apr. 25, 2023

(54) SUPPLY AND RECOVERY OF LUBRICATING OIL IN A MECHANICAL REDUCTION GEAR OF AN AIRCRAFT TURBOMACHINE

(71) Applicant: SAFRAN TRANSMISSION SYSTEMS, Colombes (FR)

(72) Inventor: Adrien Louis Simon, Saint-Denis (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 172 days.

(21) Appl. No.: 17/100,278

(22) Filed: Nov. 20, 2020

(65) Prior Publication Data
US 2021/0156307 A1 May 27, 2021

(30) Foreign Application Priority Data
Nov. 22, 2019 (FR) ...................................... 1913114

(51) Int. Cl.
*F02C 7/36* (2006.01)
*F16H 57/04* (2010.01)

(52) U.S. Cl.
CPC .......... *F02C 7/36* (2013.01); *F05D 2220/323* (2013.01); *F05D 2260/40311* (2013.01);
(Continued)

(58) Field of Classification Search
CPC ................ F02C 7/36; F05D 2220/323; F05D 2260/40311; F05D 2260/98;
(Continued)

(56) References Cited

U.S. PATENT DOCUMENTS 8,820,478 B2 9/2014 Gauthier et al.
8,876,647 B2 11/2014 Gallet et al.
(Continued)

FOREIGN PATENT DOCUMENTS

EP 2317181 A1 5/2011
EP 2559914 A1 2/2013
(Continued)

OTHER PUBLICATIONS

Rapport De Recherche Preliminaire and Written Opinion dated May 1, 2020, issued in corresponding French Application No. 1913114, filed Nov. 22, 2019, 9 pages.

*Primary Examiner* — Colby M Hansen
(74) *Attorney, Agent, or Firm* — Christensen O'Connor Johnson Kindness PLLC

(57) ABSTRACT

A lubricating oil distributor for a mechanical reduction gear of a turbomachine, in particular of an aircraft, includes a body of generally annular shape around an axis X and includes first and second independent oil circuits. The first oil circuit has a first oil inlet connected by a first chamber to several oil outlets distributed on the body around the axis X. The second oil circuit has a second oil inlet connected by a second chamber to several oil outlets distributed on the body around the axis X. The first and second chambers extend circumferentially around the axis X at different diameters, wherein the first and second oil circuits are formed in the body and are respectively a recovery circuit and an oil supply circuit for toothing of the reduction gear.

13 Claims, 5 Drawing Sheets

(52) U.S. Cl.
CPC ...... *F05D 2260/98* (2013.01); *F16H 57/0423* (2013.01); *F16H 57/0435* (2013.01); *F16H 57/0471* (2013.01); *F16H 57/0482* (2013.01)

(58) Field of Classification Search
CPC ............. F16H 57/0423; F16H 57/0435; F16H 57/0471; F16H 57/0482
USPC ....................................................... 184/6.11
See application file for complete search history.

(56) References Cited

U.S. PATENT DOCUMENTS

| | | |
|---|---|---|
| 10,458,279 B2 | 10/2019 | Gedin et al. |
| 2011/0124461 A1 | 5/2011 | Torii et al. |
| 2013/0225353 A1* | 8/2013 | Gallet ..................... F01D 25/18 |
| | | 475/159 |
| 2018/0258794 A1* | 9/2018 | Gedin ....................... F02C 7/36 |
| 2019/0085972 A1* | 3/2019 | Uhkoetter ............... F01D 25/18 |

FOREIGN PATENT DOCUMENTS

| | | |
|---|---|---|
| FR | 2987416 A1 | 8/2013 |
| FR | 3041054 A1 | 3/2017 |
| WO | 2010/092263 A1 | 8/2010 |
| WO | 2014/046926 A1 | 3/2014 |

* cited by examiner

SUPPLY AND RECOVERY OF LUBRICATING OIL IN A MECHANICAL REDUCTION GEAR OF AN AIRCRAFT TURBOMACHINE

CROSS REFERENCE TO RELATED APPLICATION

This application claims priority under 35 U.S.C. § 119 to French Patent Application No. 1913114, filed Nov. 22, 2019, which is incorporated by reference herein in its entirety.

BACKGROUND

The present disclosure relates to the field of mechanical reduction gears for turbomachines, in particular aircraft turbomachines, and in particular the supply and the recovery of lubricating oil in these reduction gears.

The prior art comprises in particular the documents WO-A1-2010/092263, FR-A1-2 987 416, EP-A1-2 317 181, US-A1-2011/124461 and FR-A1-3 041 054.

The role of a mechanical reduction gear is to change the speed and torque ratio between the input and output shafts of a mechanical system.

The new generations of dual-flow turbomachines, in particular those with a high bypass ratio, comprise a mechanical reduction gear to drive the shaft of a fan. Usually, the purpose of the reduction gear is to transform the so-called fast rotation speed of the shaft of a power turbine into a slower rotation speed for the shaft driving the fan.

Such a reduction gear comprises a central pinion, called a sun gear, a ring gear and pinions called planet gears, which are meshed between the sun gear and the ring gear. The planet gears are held by a frame called the planet carrier. The sun gear, the ring gear and the planet carrier are planet gears because their axes of revolution coincide with the longitudinal axis X of the turbomachine. The planet gears each have a different axis of revolution equally distributed on the same operating diameter around the axis of the planet gears. These axes are parallel to the longitudinal axis X.

There are several reduction gear architectures. In the prior art of double-flow turbomachines, the reduction gears are of the planetary or epicyclic type. In other similar applications, there are so-called differential or compound architectures.

On a planetary reduction gear, the planet carrier is fixed and the ring gear constitutes the output shaft of the device which rotates in the opposite direction to the sun gear.

On an epicyclic reduction gear, the ring gear is fixed and the planet carrier is the output shaft of the device which rotates in the same direction as the sun gear.

On a differential reduction gear, no element is fixed in rotation. The ring gear rotates in the opposite direction to the sun gear and the planet carrier.

The reduction gears can be composed of one or more meshing stages. This meshing is ensured in different ways such as by contact, friction or magnetic fields.

There are several types of contact meshing, such as straight, helical or herringbone toothing.

The present invention proposes an improvement of a reduction gear with a simple, efficient and economical solution to improve the supply and recovery of the lubricating oil in this reduction gear.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The invention relates to a lubricating oil distributor for a mechanical reduction gear of a turbomachine, in particular of an aircraft, this distributor having a body of generally annular shape around an axis X and comprising independent oil circuits which are formed in the body, characterized in that said circuits comprise:

an oil recovery circuit configured to recover oil, and comprising several first oil inlets distributed over the body around said axis X and connected by a first annular chamber to at least one first oil outlet, and an oil supply circuit configured to supply oil in particular to toothing of the reduction gear, and comprises a second oil inlet connected by a second annular chamber to several second oil outlets distributed on the body around said axis X, the first and second chambers extending circumferentially around the axis X at different diameters.

The distributor is thus designed to perform several functions of oil supply and recovery of lubricating oil from a reduction gear. These functions are provided by independent oil circuits. An oil circuit is dedicated to the supply of the reduction gear for its lubrication. Another oil circuit is dedicated to the recovery of the oil that has lubricated the reduction gear and its discharge for recycling. The circuits are independent so that the oil recovery is not hindered by the oil supply, and vice versa. This also limits or even prevents the risk of heating of the lubricating oil by the recovered oil, which is hotter due to the absorption of calories during the lubrication of the reduction gear.

The rapid discharge of the oil from the cavity of a reduction gear increases its efficiency. Indeed, the faster the calories generated by the transmission of the power are discharged, the lower the operating temperature and the less time the oil has had to heat up.

In the case of planetary type operation, i.e. with a fixed planet carrier and a rotating ring gear, there is no possibility of centrifugation of the oil around the sun gear. This can lead to so-called stirring or even churning, which corresponds to the accumulation of hot oil in the reduction gear.

This invention is thus compatible with a planetary reduction gear with a fixed planet carrier and a rotating ring gear. It is also compatible with any type of toothing (straight, helical, herringbone). It is also compatible with any type of planet carrier, whether monobloc or cage/and cage carrier type. Finally, it is compatible with any type of planet gear bearing, whether it is made up of rolling elements, hydrodynamic bearing, etc.

The distributor according to the invention may comprise one or more of the following characteristics, taken in isolation from each other, or in combination with each other:

said circuits comprise a further oil supply circuit which is independent and configured to supply oil in particular to the bearings of the reduction gear, said further supply circuit comprising at least one third oil inlet connected by a third annular chamber to several third oil outlets distributed on the body around said axis X, the body of the distributor is made in one piece.

the first oil outlet of the recovery circuit, the second oil inlet of the supply circuit, and the third oil inlet of the further supply circuit are oriented in a radial direction with respect to said axis X.

each of the chambers is of the closed type, as opposed to, for example, a gutter, the inner or outer periphery of which is open.

said first, second and/or third chambers are formed by coaxial and closely connected tubular rings.

the first outlet of the recovery circuit, and said second outlets of the supply circuit, and said third outlets of the further supply circuit, are oriented axially in the same direction.

said inlets of the third circuit are located close to the outlets of said first circuit.

the distributor comprises bosses distributed on the body around said axis X, each of these bosses comprising first inlets of the recovery circuit and one of the second outlets of the supply circuit.

the chamber of the further supply circuit has a larger diameter than that of the chamber of the supply circuit, which is itself preferably larger than that of the chamber of the recovery circuit.

The invention also relates to a mechanical reduction gear for an aircraft turbomachine, this reduction gear comprising a cage defining a housing for receiving a central sun gear of axis X of rotation, planet gears arranged around the sun gear, deflectors fixed to the cage and arranged between the planet gears, and a distributor as described above which is attached and fixed to the cage and which is connected to the deflectors, the distributor being configured to supply lubricating oil to toothing of the sun gear and planet gears, or even the planet gear bearings, and to recover at least a part of this oil via said deflectors.

Advantageously, each of the deflectors comprises a block comprising two opposite side faces of generally curved shape extending around said planet gears, and on which are located oil inlet orifices in fluid communication with the oil recovery circuit for recovering oil from toothing of the reduction gear.

Preferably, said oil inlet orifices are connected to an oil outlet port of the block of the deflector, via inner channels of the block which are shaped to convey the recovered oil to this port by means of the centrifugal forces applied to this oil projected by the planet gears arranged on either side of the deflector.

The invention also relates to a deflector for a mechanical reduction gear of a turbomachine, in particular an aircraft, this deflector being intended to be interposed between two adjacent planet gears of said reduction gear, this deflector comprising a block comprising a first lubricating oil circuit which comprises at least one oil inlet port and at least an oil outlet orifice or port for lubricating the reduction gear, characterized in that it further comprises a second independent lubricating oil circuit which comprises at least an oil inlet orifice and at least one oil outlet port for oil recycling.

The deflector thus combines several functions, including the supply and the recovery of lubricating oil for a reduction gear. Each of these functions is provided by an oil circuit. A first oil circuit is dedicated to the supply of the reduction gear for its lubrication. The second oil circuit is dedicated to the recovery of the oil that has lubricated the reduction gear and its discharge for recycling. The circuits are independent so that the oil recovery is not hindered by the oil supply, and vice versa. This also limits or even prevents the risk of heating of the lubricating oil by the recovered oil, which is hotter due to the absorption of calories during the lubrication of the reduction gear.

This invention is compatible with a planetary reduction gear with a fixed planet carrier and a rotating ring gear. It is also compatible with any type of gearing (straight, herringbone). It is also compatible with any type of planet carrier, whether monobloc or cage/cage carrier type. Finally, it is compatible with any type of planet gear bearing, whether it is made up of rolling elements, a hydrodynamic bearing, etc.

The deflector according to the invention may comprise one or more of the following characteristics, taken in isolation from each other, or in combination with each other:

the oil inlet port of the first circuit and the oil outlet port of the second circuit are located close to each other and on the same face of said block, the oil inlet port of the first circuit and the oil outlet port of the second circuit are oriented in substantially parallel directions, the deflector comprises a radially inner end intended to be oriented towards a main axis of rotation of the reduction gear, and a radially outer end intended to be oriented radially opposite to this axis, the oil inlet port of the first circuit and the oil outlet port of the second circuit being located at said radially inner end, the first circuit comprises outlet and oil projection orifices which are located at said radially inner end, the first circuit may include an oil outlet port or orifice which is located at said radially outer end, the block comprises two opposite side faces of generally curved shape and on which are located oil inlet orifices of said second circuit, the oil inlet orifices are located at said radially inner end, each of said ports comprises a tubular watertight and fluid connection nozzle.

The invention also relates to a planet carrier for a mechanical reduction gear of a turbomachine, in particular an aircraft, comprising a cage defining a housing for receiving a central sun gear with an axis X of rotation, planet gears arranged around the sun gear, as well as deflectors as described above which are each fixed to the cage and interposed between two adjacent planet gears.

The invention furthermore concerns a mechanical reduction gear of a turbomachine, in particular an aircraft, comprising at least one of the elements (deflector, distributor, planet carrier, etc.) described above.

Finally, the invention relates to a turbomachine comprising at least one of the elements (deflector, distributor, planet carrier, reduction gear, etc.) described above.

The characteristics of the different aspects of the invention can be combined with each other.

DESCRIPTION OF THE DRAWINGS

The foregoing aspects and many of the attendant advantages of this present disclosure will become more readily appreciated as the same become better understood by reference to the following detailed description, when taken in conjunction with the accompanying drawings, wherein.

DETAILED DESCRIPTION

Figure 1:
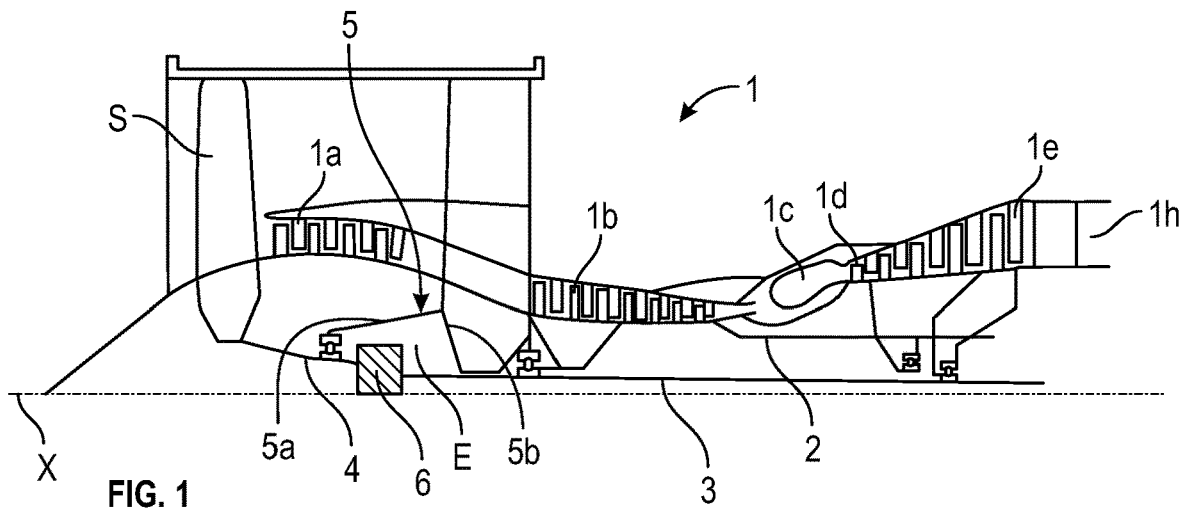
FIG. 1 is a schematic cross-sectional view of a turbomachine using the invention.

FIG. 1 describes a turbomachine 1 which comprises, in a conventional manner, an axis of rotation X, a fan S, a low-pressure compressor 1a, a high-pressure compressor 1b, an combustion annular chamber 1c, a high-pressure turbine 1d, a low-pressure turbine 1e and an exhaust nozzle 1h. The high-pressure compressor 1b and the high-pressure turbine 1d are connected by a high-pressure shaft 2 and form with it a high-pressure (HP) body. The low-pressure compressor 1a and the low-pressure turbine 1e are connected by a low-pressure shaft 3 and form a low-pressure (LP) body with it.

The fan S is driven by a fan shaft 4, which is driven to the LP shaft 3 by means of a reduction gear 6. This reduction gear 6 is usually of the planetary or epicyclic type.

The following description refers to a reduction gear of the planetary type wherein the ring gear is mobile in rotation.

The reduction gear 6 is positioned in the upstream part of the turbomachine. A fixed structure comprising schematically, here, an upstream part 5a and a downstream part 5b which makes up the engine casing or stator 5 is arranged so as to form an enclosure E surrounding the reduction gear 6. This enclosure E is herein closed upstream by seals at the level of a bearing allowing the passage of the fan shaft 4, and downstream by seals at the level of the passage of the LP shaft 3.

Figure 2:
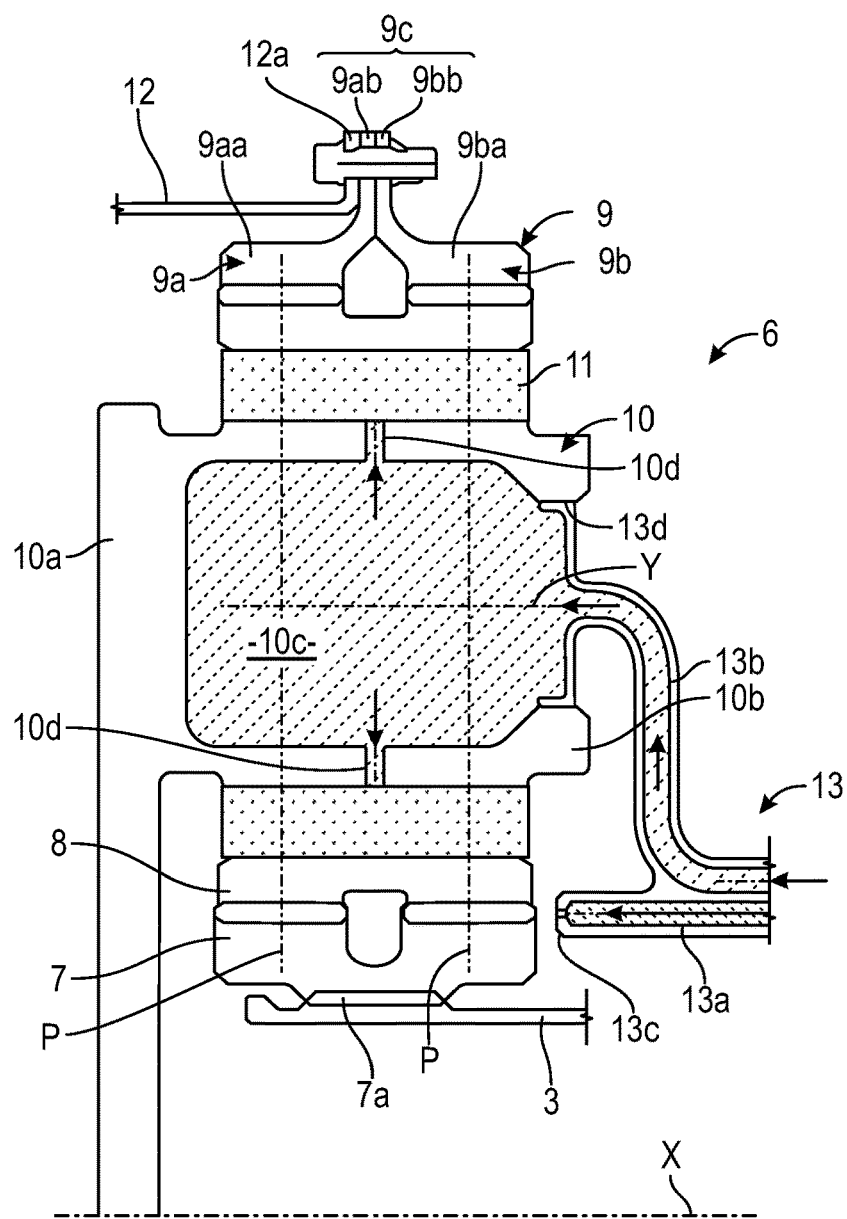
FIG. 2 is a cross-section in partial view of a mechanical reduction gear.

FIG. 2 shows a reduction gear 6 which can take the form of different architectures depending on whether some parts are stationary or in rotation. At the inlet side, the reduction gear 6 is connected to the LP shaft 3, e.g. via inner splines 7a. Thus, the LP shaft 3 drives a planetary pinion called the sun gear 7. Classically, the sun gear 7, the axis of rotation of which is the same as that of the turbomachine X, drives a series of pinions called planet gears 8, which are equally distributed on the same diameter around the axis of rotation X. This diameter is equal to twice the operating center distance between the sun gear 7 and the planet gears 8. The number of planet gears 8 is generally defined between three and seven for this type of application.

The set of planet gears 8 is maintained by a frame called planet carrier 10. Each planet gear 8 rotates around its own axis Y and meshes with the ring gear 9.

In this planetary configuration, the set of planet gears 8 is held by a planet carrier 10 which is fixed to the engine casing or stator 5. Each planet gear drives the ring gear which is connected to the fan shaft 4 via a ring gear carrier 12.

Each planet gear 8 is freely rotatably mounted by means of a bearing 11, e.g. of the rolling or hydrodynamic bearing type. Each bearing 11 is mounted on one of the axles 10b of the planet carrier 10 and all the axes are positioned relative to each other by means of one or more structural frames 10a of the planet carrier 10. There is a number of axles 10b and bearings 11 equal to the number of planet gears. For operational, assembly, manufacturing, inspection, repair or spare parts reasons, the axles 10b and the frame 10a can be separated into several parts.

For the same reasons mentioned above, the toothing of a reduction gear can be divided into several helices, each with a median plane P. In the example shown, the ring gear is separated into two half ring gears:

an upstream half-ring gear 9a consisting of a rim 9aa and a mounting half-flange 9ab. On the rim 9aa is the upstream helix of the toothing of the reduction gear. This upstream helix meshes with that of the planet gear 8 which meshes with that of the sun gear 7.

a rear half-ring gear 9b made up of a rim 9ba and a mounting half-flange 9bb. On the rim 9ba is the downstream helix of the toothing of the reduction gear. This downstream helix meshes with that of the planet gear 8 which meshes with that of the sun gear 7.

The mounting half-flange 9ab of the upstream ring gear 9a and the mounting half-flange 9bb of the downstream ring gear 9b form the mounting flange 9c of the ring gear. The ring gear 9 is attached to a ring gear carrier by assembling the mounting flange 9c of the ring gear and the mounting flange 12a of the ring gear carrier using a bolted assembly for example.

The arrows in FIG. 2 describe the oil flow in the reduction gear 6. The oil enters the reduction gear 6 from the stator part 5 into a distributor 13 by various means that will not be specified in this view because they are specific to one or more types of architecture. The distributor is separated into 2 parts, each of which is usually repeated with the same number of planet gears. The injectors 13a have the function to lubricate the teeth and the arms 13b have the function to lubricate the bearings. The oil is fed to the injector 13a to come out through the end 13c to lubricate the toothing. The oil is also fed to the arm 13b and flows through the supply port 13d of the bearing. The oil then flows through the shaft into a 10c buffer zone(s) and out through the orifices 10d to lubricate the bearings of the planet gears.

Figure 3:
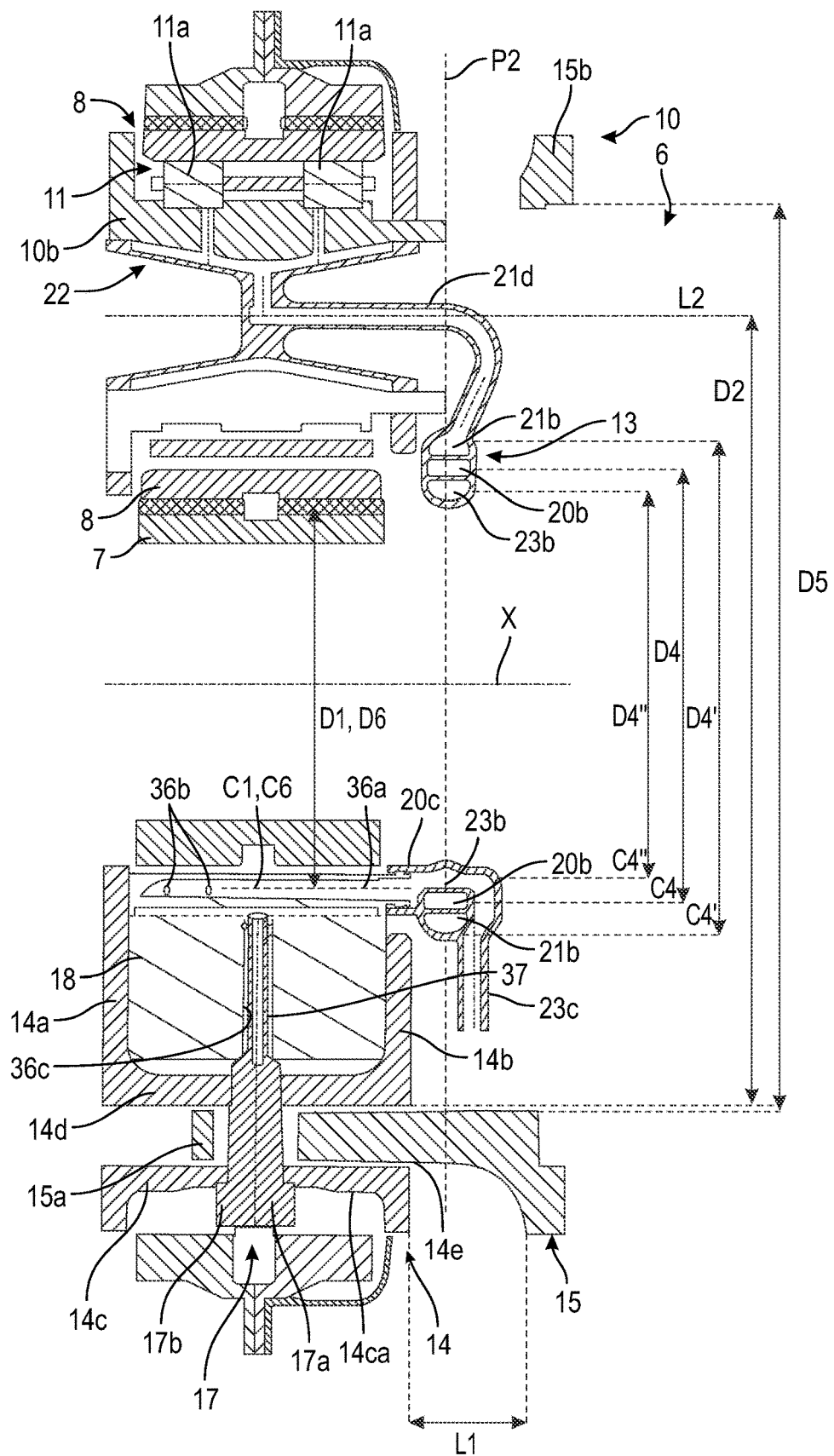
FIG. 3 is a cross-sectional view of a mechanical reduction gear integrating several aspects of the invention.

FIG. 3 shows an embodiment of a reduction gear 6 comprising several aspects of the invention.

One of these aspects relates to a lubricating oil distributor and will be described in the following with reference to FIGS. 4, 5 and 9 in particular. Another aspect of the invention relates to a deflector and will be described in the following with reference to FIGS. 5 to 8.

The reduction gear 6 comprises a planet carrier 10 of the type with cage 14 and cage carrier 15, the cage 14 and cage carrier 15 being connected by ball-and-socket joints.

The cage 14 comprises two radial annular walls 14a, 14b extending around the axis X, these walls 14a, 14b being parallel and being respectively an upstream radial wall 14a and a downstream radial wall 14b. The walls 14a, 14b are connected to each other at their outer peripheries by pairs of bridges 14c, 14d, evenly distributed around the axis X. These pairs of bridges provide a structural connection between the walls 14a, 14b. Each pair of bridges comprises two bridges, respectively radially outer 14c and radially inner 14d, which extend substantially parallel along the axis X at a radial distance from each other.

Each pair of bridges forms a clevis to accommodate a finger 15a of cage carrier 15. In other words, the bridges of each pair define between them a housing for a finger 15a of the cage carrier 15. Openings 14e of oblong shape are made in the rear wall 14b so that the fingers 15a can pass between the bridges 14c, 14d. The wall 14a may comprise similar openings aligned axially with the openings 14e of the wall 14b.

The number of fingers 15a is equal to the number of pairs of bridges 14c, 14d and is 5 in the example shown. These fingers 15a project axially upstream from a ring 15b of the cage carrier 15 extending around the axis X. The fingers 15a of the cage carrier 15 are engaged in the inter-bridge housings by axial translation from the rear, through the openings 14e in the wall 14b.

Each finger 15a comprises, substantially in its middle, a mounting recess of a bearing (not shown) intended to be traversed by a cylindrical pin 17 carried by each pair of bridges 14c, 14d. Each pin 17 passes through the inter-bridge housing and has a substantially radial orientation with respect to the axis X. Each pin 17 comprises a cylindrical body 17a connected at one end, radially outer herein, to a collar 17b. The pin 17 is here engaged by radial translation from the outside through radial orifices in the bridges 14c, 14d, its collar 17b being intended to come into radial contact with a flat face 14ca of the outer bridge 14c. After inserting the pin 17 in the orifices of the bridges, until the collar 17b rests on the outer bridge, the collar 17b is fixed to this bridge, for example by screwing.

As shown in the drawings, in assembled position, the ring 15b of the cage carrier 15 is axially spaced a predetermined distance L1 from the downstream wall 14b facing the cage 14 (FIG. 3).

The cage 14 defines an internal housing for the reception of the sun gear 7 of axis X, of the planet gears 8 arranged around the sun gear 7 and meshed with it, as well as of the deflectors 18 which will be described in detail in the following with reference to FIGS. 5 to 9.

Figure 4:
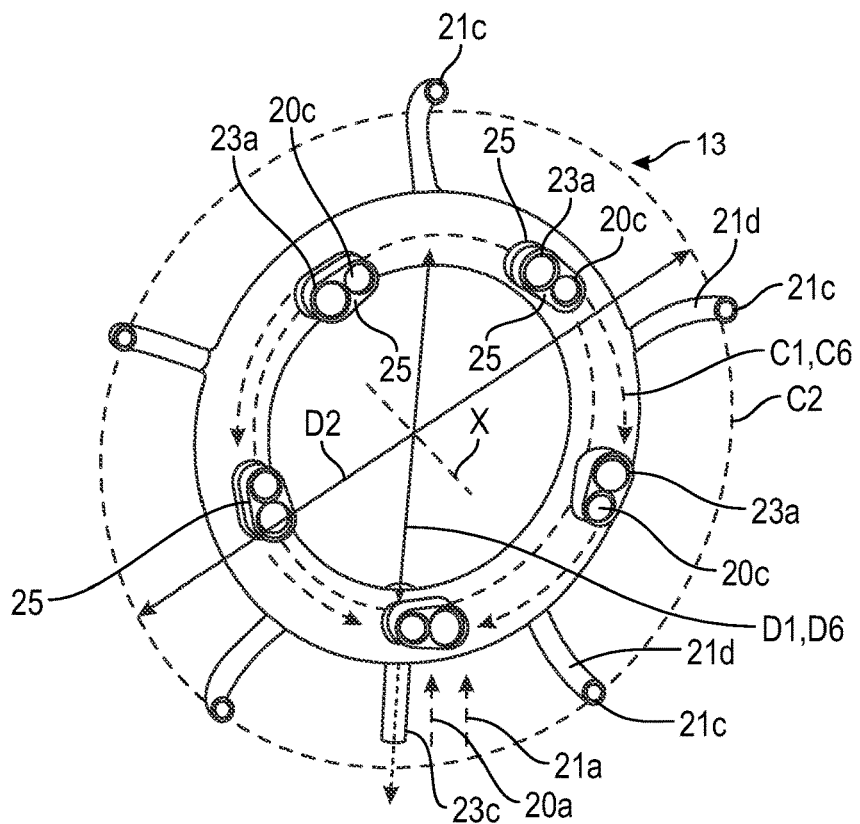
FIG. 4 is a perspective view of a lubricating oil distributor for the reduction gear in FIG. 3.

The reduction gear 6 comprises an improved lubricating oil distributor 13 which is best seen in FIG. 4.

The distributor 13 is generally annular in shape around the axis X and is made in one piece. It is attached to the planet carrier 10 and can comprise for this brackets (not shown) on the cage 14 of the planet carrier.

The distributor 13 comprises independent oil circuits 20, 21, 23 comprising:
- a first oil circuit 20 comprising a first oil inlet 20a connected by a first annular chamber 20b to several oil outlets 20c distributed on a first circumference C1 around the axis X,
- a second oil circuit 21 comprising a second oil inlet 21a connected by a second annular chamber 21b to several oil outlets 21c distributed on a second circumference C2 around the axis X, and
- a third independent oil circuit 23 for the recovery of oil from the reduction gear, this third oil circuit comprising several oil inlets 23a distributed on a third circumference C6 around the axis X and connected by a third annular chamber 23b to at least an oil outlet 23c.

As can be seen in FIG. 4, the inlets 23a and the outlets 20c are preferably made in bosses 25 of the distributor 13. These bosses 25 are evenly distributed around the axis X, on the same axial side, here upstream, of the distributor 13.

The circumference C1 has a diameter D1, the circumference C2 has a diameter D2, and the circumference C6 has a diameter D6.

D2 is greater than D1. D6 is here similar or even identical to D1 but could be different from D1.

In the example shown, D1, D2 and D6 are each greater than D5 which is the inner diameter of the ring 15b. The distributor 13 is diametrically smaller than D5 which allows its assembly/disassembly without having to touch the rest. Because of the pins 17 and deflectors 18, the cage 14 and cage carrier 15 are mounted first, then the sun gear 7, the planet gears 8, the axles 10b and finally the distributor 13.

The chambers 20b, 21b, 23b are formed by coaxial tubular rings and intimately linked, i.e. their tubular walls are fused together. These chambers have in axial section any general shape and the passage sections of the chambers are substantially constant over their entire angular extent. In the example shown, the chambers 21b, 23b have in section a semi-circular general shape and the chamber 20b has in section a rectangular general shape. We also see that the chambers are arranged in a radially stepped manner, with the chamber 21b extending around the chamber 20b which extends around the chamber 23b (see FIG. 5).

The first chamber 20b extends substantially over a circumference C4 of diameter D4 comprised between D1 and D2. The second chamber 21b extends substantially over another circumference C4' of diameter D4' between D1 and D2. The third chamber 23b extends substantially over another circumference C4" of diameter D4" comprised between D1 and D2. D4" is smaller than D4' which is smaller than D4. The circumferences C4, C4' and C4" are centered on the axis X.

Figure 5:
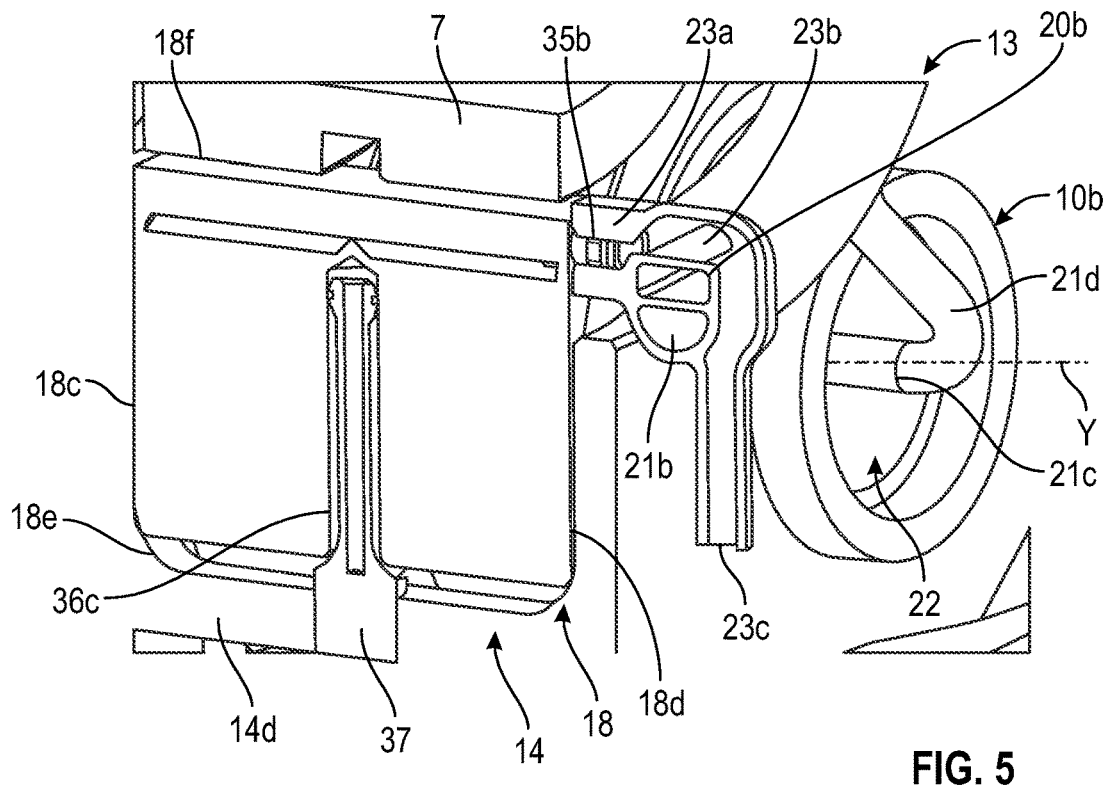
FIG. 5 is a partial cross-sectional and perspective view of the reduction gear of FIG. 3 and shows a connection of the distributor of FIG. 4 to a deflector.
Figure 6:
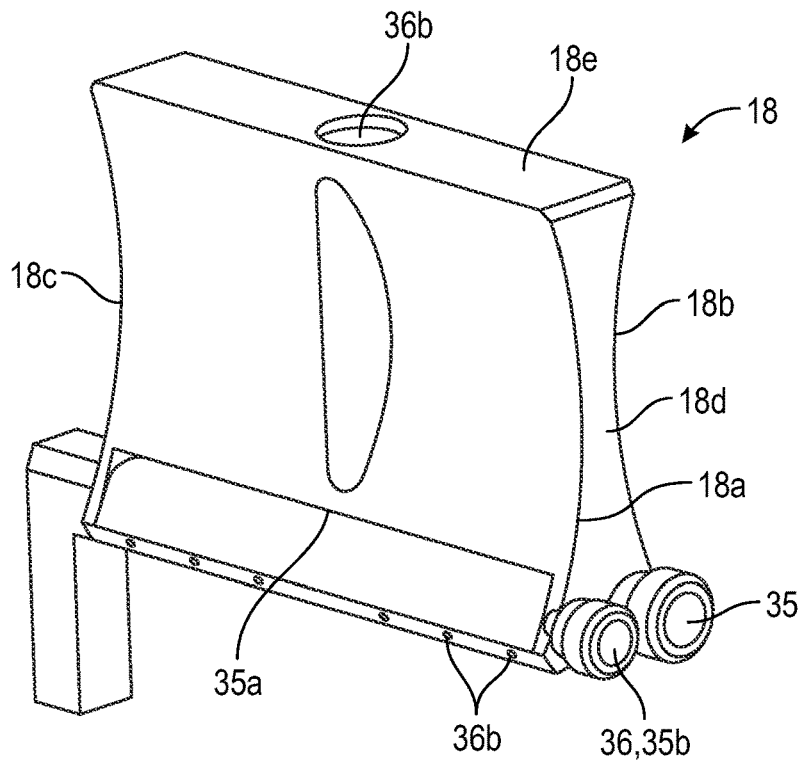
FIG. 6 is a perspective view of a deflector of the reduction gear of FIG. 3.
Figure 7:
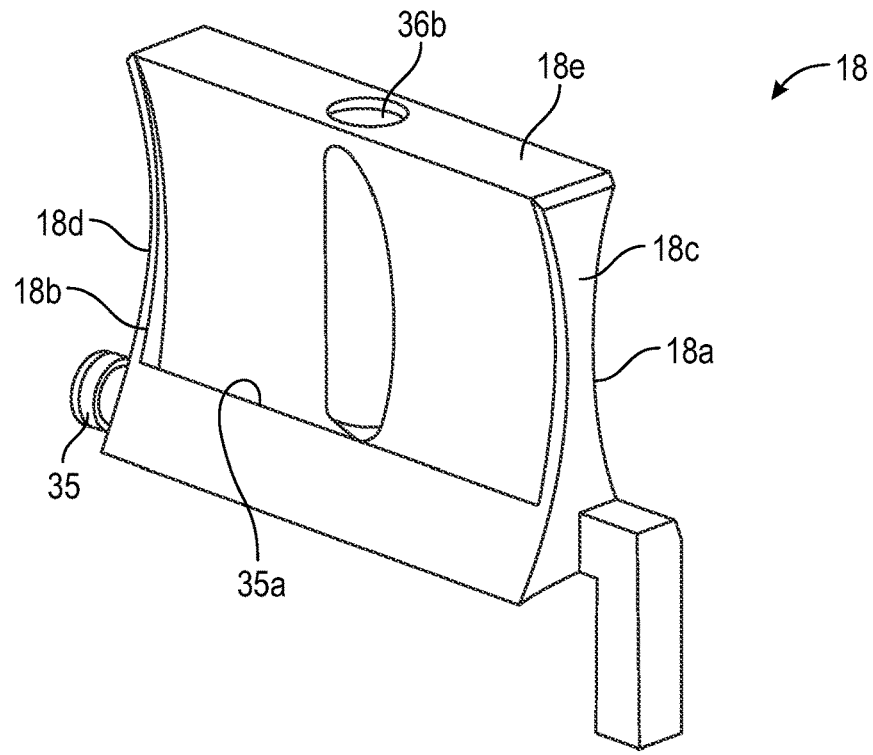
FIG. 7 is another perspective view of the deflector of FIG. 6.

As shown in FIGS. 3 and 5, the chambers 20b, 21b, 23b extend in a plane P2 perpendicular to the axis X, which passes between the cage 14, on the one hand, and the ring 15b of the cage carrier 15, on the other hand. It can also be seen that the diameter D4" is larger than that D3' of the section 3b to avoid any risk of contact during operation.

The inlets 20a, 21a and the outlet 23c can be oriented in a radial direction with respect to the axis X. The outlet 23c is preferably located at 6 o'clock by analogy with the dial of a clock so that the oil flows by gravity from the distributor 13 to a recycling system.

The plane P3 is preferably located between the cage 14 and the ring 15b of the cage carrier 15.

The distributor 13 is advantageously configured to be fluidly connected, at its inlets and outlets, by male-female type pluggings, i.e. connectors that only require the axial translation of a male connector into a female connector. Even if a coupling is presented in the following as male and intended to cooperate with a female coupling, it can alternatively be replaced by a female coupling intended to cooperate with a male coupling, and vice versa. The male-female connections can be sealed with O-rings or similar.

The inlets 20a, 21a and the outlet 23c may each comprise a female connector to receive the male connector of a hose connected to a lubricating oil source.

For the outlets 20c, they each comprise a female connector 20ca, as shown in the example, which is intended to receive the male connector of one of the deflectors 18. These outlets 20c are oriented axially, all in the same direction here towards the front.

As for the outlets 21c, they each comprise a female connector in the example shown, which is intended to receive a male connector from one of the lubrication and cooling cores 22.

The function of the cores 22 is to lubricate and cool the axles 10b of the planet gears 8, which are here centered and guided by the bearings 11 of rollers 11a.

In the examples of embodiments shown, each axle 10b is guided by a double roller bearing 11, i.e. with double row of rollers 11a. The two rows extend around the same axis, which is the same as the axis, noted Y, of the axle 10b of the planet gear 8.

The outlets 21c are oriented axially, all in the same direction here towards the front. The connections of these outlets are connected to the chamber 21b by approximately L-shaped conduits 21d.

As far as the inlets 23a are concerned, they each comprise a female connector in the example shown, which is intended to receive a male connector from one of the deflectors 18. These inlets 23a are oriented axially, all in the same direction here towards the front.

Finally, as shown in FIG. 5, the channels 21d are connected to the ring forming chamber 21b by tappings located on the outer periphery of this ring, while the inlets 23a and the outlets 20c are directly formed on the ring forming the chambers.

FIGS. 5 to 9 illustrate an embodiment of a deflector 18. As mentioned above, the reduction gear 6 comprises several deflectors 18 which are housed in the cage 14 and are each arranged between two adjacent planet gears 8. The number of deflectors 18 in reduction gear 6 is therefore equal to the number of planet gears 8 in this reduction gear.

The primary function of a deflector 18 is to guide the lubricating oil to the toothing and to prevent oil recirculation between the planet gears, hence the term "inter-planet gear deflector". The deflectors 18 are thus shaped to match the peripheral shape of the planet gears 8.

As shown in the drawings, in addition to extending between two adjacent planet gears 8, each deflector 18 is located between the sun gear 7 on the one hand, located radially inside, and a pair of bridges 14c, 14d on the other hand, located radially outside.

Figure 8:
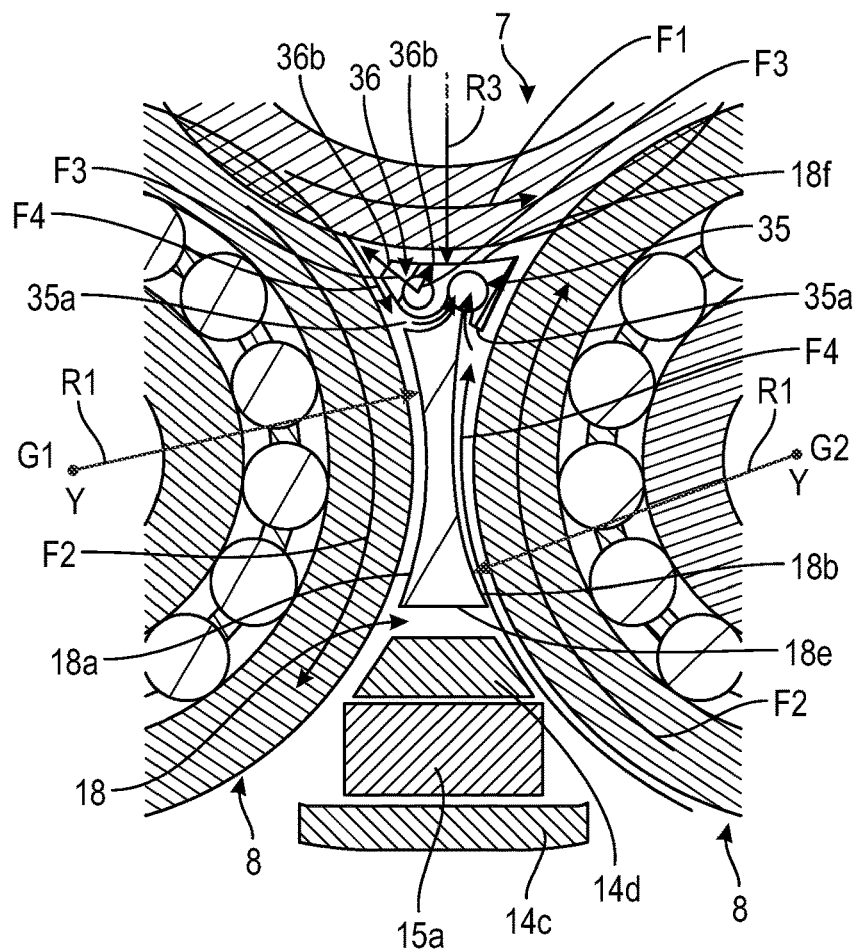
FIG. 8 is a partial cross-sectional view of the reduction gear of FIG. 3.
Figure 9:
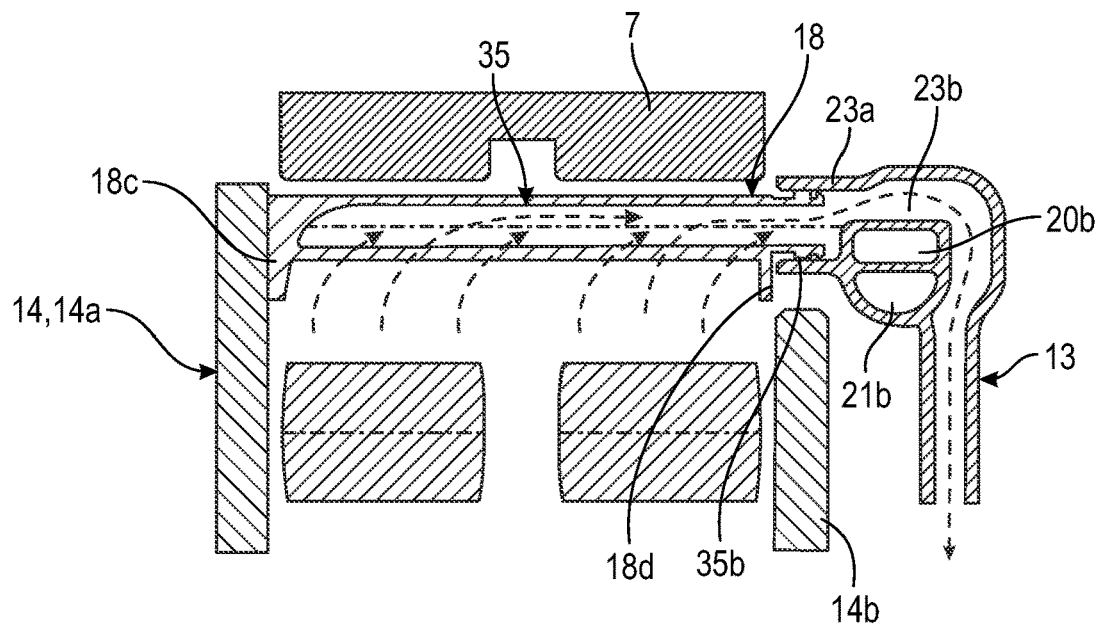
FIG. 9 is a view similar to FIG. 3 and on a larger scale.

Each deflector 18 comprises a block comprising a first lateral surface 18a which is cylindrical and concave and has a radius of curvature R1 measured from an axis G1, which is merged with the axis Y of rotation of a planet gear 8 (FIG. 8). The block comprises a second lateral surface 18b, opposite the first surface 18a, which is cylindrical and concave and has a radius of curvature R1 measured from an axis G2 which is parallel to G1, and which is coincident with the axis Y of rotation of another planet gear 8.

The block of each deflector 18 further comprises an upstream flat face 18c, which is substantially radial when the deflector is mounted in the cage 14 of the reduction gear, and a downstream flat face 18d, which is also substantially radial. The block further comprises a radially outwards flat face 18e, which is intended to be oriented on the side of the pair of bridges 14c, 14d, and a radially inwards face 18f, which is intended to be oriented on the side of the sun gear 7. This face 18f is cylindrical and concave and has a radius of curvature R3 measured from an axis, which is merged with the axis X of the sun gear. This face 18f has therefore the function of guiding the lubricating oil of the toothing of the sun gear.

The deflectors 18 extend between the radial walls 14a, 14b of the cage 14 and have their faces 18c, 18d which are supported on the inner faces opposite these walls 14a, 14b. The deflectors 18 are fixed to the cage 14 by screws for example.

Each deflector 18 has two independent integrated oil circuits 35, 36, which comprise:
a first lubricating oil circuit 36 which comprises at least one oil inlet port 36a and at least one oil outlet orifice 36b or port for lubricating the reduction gear,
a second oil recovery circuit 35, which is independent of the first circuit 36, and which comprises at least one oil inlet orifice 35a and at least one oil outlet port 35b for oil recycling The first circuit 36 comprises an oil inlet 36a connected by bores to at least one oil outlet orifice 36b. In the example shown, the oil inlet 36a is located on the downstream side 18d and comprises a tubing designed to form a male connector and to cooperate by male-female plugging with an outlet 20c of the distributor 13 described above. Although a connector is presented in the following as male and intended to cooperate with a female connector, it may alternatively be replaced by a female connector intended to cooperate with a male connector, and vice versa (FIG. 3). The orifices 36b are here located close to the face 18f of the deflector and are oriented towards the teeth of the sun gear 7 and at least a planet gear 8.

Each deflector 18 may comprise at least one oil outlet port 36c forming a female connector that is intended to receive a sealed fluid connection bushing 37 (FIGS. 3 and 5). Like the inlet 36a, the bushing 37 can be removed and replaced by a male connector. The port 36c is here located on the radially outer face 18e of each deflector. FIG. 3 shows that a half of the bushing 37 is engaged by male-female plugging into the port 36c and the other half is engaged by male-female plugging into a female orifice on the radially inner end of the body 17a of the pin 17 carried by a pair of bridges 14c, 14d.

The second circuit 35 comprises oil inlet orifices 35a which are located on the faces 18a, 18b in the example shown. The oil that flows during operation on these faces 18a, 18b is thus recovered for recycling, which avoids its re-projection on the adjacent planet gears 8.

The second circuit 35 also comprises an oil outlet port 35b which is located on the downstream face 18d and comprises a tubing designed to form a male connector and to cooperate by male-female plugging with an inlet 23a of the distributor 13 described above. Even if a connector is presented in the following as male and intended to cooperate with a female connector, it may alternatively be replaced by a female connector intended to cooperate with a male connector, and vice versa.

It can be seen from the drawings that the oil inlet port 36a of the first circuit 36 and the oil outlet port 35b of the second circuit 35 are located close to each other and on the same face 18d of the block of the deflector 18. These ports 36a, 35b are here located close to the side 18f of the deflector and are oriented in substantially parallel directions.

FIG. 8 shows the directions of rotation of the sun gear 7 (arrow F1) and planet gears 8 (arrows F2), the orientations of the oil projections from the orifices 36b of the first circuit 36 of the deflector 18 (arrow F3) as well as the oil flows after lubrication and recovery of this oil in the second circuit 35 of the deflector 18 (arrow F4). FIGS. 8 and 9 show that the circuit 35 is preferably configured to take advantage of the direction of the centrifuged oil around the planet gears to conserve the energy of the oil during its recovery.

During operation, it is thus understood that lubricating oil is firstly supplied by the distributor 13 of a part of the cores 22 and axles 10b of the planet gears 8 for the lubrication of the bearings 11, and to the first circuits 36 of the deflectors 18 for the lubrication of the toothing of the sun gear 7 and the planet gears 8. Lubricating oil from the reduction gear 6 is projected onto the faces 18a, 18b of the deflectors 18 and flows into the second circuits 35 of the deflectors through the orifices 35a. This oil is conveyed to the ports 35b where it is discharged through the distributor 13 for recycling.

The purpose here is to collect and discharge the oil as soon as possible after it has been used in the gear.

For a planetary type reduction gear, the invention aims to provide an oil distributor that supplies oil to the toothing of the planet gear and the bearings of the planet gears and that also allows the oil to be recovered to evacuate it efficiently.

For this purpose, the distributor comprises oil supply circuits separate from the oil discharge circuit.

It is understandable that this allows for more efficient oil discharge compared to prior art architecture where the oil is recovered after flowing against the crankcase and transiting to a low point (at 6 o'clock).

While illustrative embodiments have been illustrated and described, it will be appreciated that various changes can be made therein without departing from the spirit and scope of the disclosed subject matter.

The embodiments of the invention in which an exclusive property or privilege is claimed are defined as follows:

1. A lubricating oil distributor for a mechanical reduction gear of a turbomachine, comprising:
a body of generally annular shape around an axis X; and
independent oil circuits formed in the body, the circuits comprising:
an oil recovery circuit configured and dedicated only to recover oil and comprising several first oil inlets distributed over the body around said axis X and connected by a first annular chamber to at least one first oil outlet, and
a first oil supply circuit configured and dedicated only to supply oil to toothing of the reduction gear and comprising a second oil inlet connected by a second annular chamber to several second oil outlets distributed on the body around said axis X, the first and second chambers extending circumferentially around the axis X at different diameters,
wherein said oil recovery circuit and said first oil supply circuit are independent so that the oil recovery is not hindered by the oil supply, and vice versa.

2. The distributor according to claim 1, wherein said circuits further comprise a second oil supply circuit which is independent and configured to supply oil to bearings of the reduction gear, the second oil supply circuit comprising at least one third oil inlet connected by a third annular chamber to several third oil outlets distributed on the body around said axis X.

3. The distributor according to claim 2, wherein the first oil outlet of the recovery circuit, the second oil inlet of the first oil supply circuit, and the third oil inlet of the second oil supply circuit, are oriented in a radial direction with respect to said axis X.

4. The distributor according to claim 2, further comprising bosses distributed on the body around said axis X, each of these bosses comprising one of the first inlets of the recovery circuit and one of the second outlets of the first oil supply circuit.

5. The distributor according to claim 2, wherein the chamber of the second oil supply circuit has a larger diameter than that of the chamber of the first oil supply circuit, which is larger than that of the chamber of the recovery circuit.

6. The distributor according to claim 1, wherein the first outlet of the recovery circuit, said second outlets of the first oil supply circuit, and said third outlets of the second oil supply circuit are oriented axially in the same direction.

7. The distributor according to claim 1, wherein the body is made in one piece.

8. A mechanical reduction gear for an aircraft turbomachine, this reduction gear comprising a cage defining a housing configured to receive a central sun gear of axis X of rotation, planet gears arranged around the sun gear, deflectors fixed to the cage and arranged between the planet gears, and a distributor according to claim 1, which is attached and fixed to the cage and which is connected to the deflectors, the distributor being configured to supply lubricating oil to toothing of at least one of the sun gear, the planet gears, and the planet gear bearings and to recover at least a part of this oil via said deflectors.

9. The reduction gear according to claim 8, wherein each of the deflectors comprises a block comprising two opposite side faces of generally curved shape extending around said planet gears, and on which are located oil inlet orifices in fluid communication with the oil recovery circuit for recovering oil from toothing of the reduction gear.

10. The reduction gear according to claim 9, wherein said oil inlet orifices are connected to an oil outlet port of the block of the deflector via inner channels of the block which are configured to convey recovered oil to the oil inlet port by centrifugal forces applied to the recovered oil projected by the planet gears arranged on either side of the deflector.

11. An aircraft turbomachine, comprising a mechanical reduction gear equipped with a planet carrier according to claim 10.

12. A lubricating oil distributor for a mechanical reduction gear of a turbomachine, comprising:
a body of generally annular shape around an axis X; and
independent oil circuits formed in the body, the circuits comprising:
an oil recovery circuit configured to recover oil and comprising several first oil inlets distributed over the body around said axis X and connected by a first annular chamber to at least one first oil outlet, and
a first oil supply circuit configured to supply oil to toothing of the reduction gear and comprising a second oil inlet connected by a second annular chamber to several second oil outlets distributed on the body around said axis X, the first and second chambers extending circumferentially around the axis X at different diameters,
wherein said circuits further comprise a second oil supply circuit which is independent and configured to supply oil to bearings of the reduction gear, the second oil supply circuit comprising at least one third oil inlet connected by a third annular chamber to several third oil outlets distributed on the body around said axis X.

13. A lubricating oil distributor for a mechanical reduction gear of a turbomachine, comprising:
a body of generally annular shape around an axis X; and
independent oil circuits formed in the body, the circuits comprising:
an oil recovery circuit configured to recover oil and comprising several first oil inlets distributed over the body around said axis X and connected by a first annular chamber to at least one first oil outlet, and
a first oil supply circuit configured to supply oil to toothing of the reduction gear and comprising a second oil inlet connected by a second annular chamber to several second oil outlets distributed on the body around said axis X, the first and second chambers extending circumferentially around the axis X at different diameters,
wherein the first outlet of the recovery circuit, said second outlets of the first oil supply circuit, and said third outlets of the second oil supply circuit are oriented axially in the same direction.

* * * * *